(12) United States Patent
Huang et al.

(10) Patent No.: US 12,172,703 B2
(45) Date of Patent: Dec. 24, 2024

(54) VEHICLE BODY FRAMEWORK CONNECTOR AND VEHICLE WITH SAME

(71) Applicant: BYD COMPANY LIMITED, Guangdong (CN)

(72) Inventors: Fengshou Huang, Shenzhen (CN); Meijun Yu, Shenzhen (CN); Yanan Pan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 373 days.

(21) Appl. No.: 17/679,976

(22) Filed: Feb. 24, 2022

(65) Prior Publication Data

US 2022/0177046 A1 Jun. 9, 2022

Related U.S. Application Data

(63) Continuation of application No. PCT/CN2020/109160, filed on Aug. 14, 2020.

(30) Foreign Application Priority Data

Aug. 30, 2019 (CN) .......................... 201910812425.5

(51) Int. Cl.
*B62D 27/02* (2006.01)
*B62D 27/06* (2006.01)
(Continued)

(52) U.S. Cl.
CPC ............. *B62D 27/02* (2013.01); *B62D 27/06* (2013.01); *F16B 7/18* (2013.01); *B62D 31/02* (2013.01)

(58) Field of Classification Search
CPC .... B62D 27/023; B62D 27/06; B62D 27/065; B62D 27/02; B62D 31/02; B62D 25/04;
(Continued)

(56) References Cited

U.S. PATENT DOCUMENTS 4,230,361 A * 10/1980 Nachbur .............. B62D 29/008
296/30
4,462,629 A * 7/1984 Todori ................. B62D 27/023
296/201
(Continued)

FOREIGN PATENT DOCUMENTS

CN 103158790 A 6/2013
CN 203306118 U 11/2013
(Continued)

OTHER PUBLICATIONS

International Search Report from PCT /CN2020/109160 dated Nov. 17, 2020 (3 pages).

*Primary Examiner* — Gregory A Blankenship
(74) *Attorney, Agent, or Firm* — Calfee, Halter & Griswold LLP

(57) ABSTRACT

A body frame joint and a vehicle having the same are provided. The body frame joint includes: a first sub-joint; and a second sub-joint. The first sub-joint and the second sub-joint are adapted to be mounted to a body frame. A transverse beam connection groove and a longitudinal beam connection groove are defined by engaging the first sub-joint and the second sub-joint. The transverse beam connection groove is adapted to accommodate a transverse beam of the body frame, and the longitudinal beam connection groove is adapted to accommodate a longitudinal beam of the body frame.

18 Claims, 7 Drawing Sheets

(51) Int. Cl.
  *B62D 31/02* (2006.01)
  *F16B 7/18* (2006.01)
(58) Field of Classification Search
  CPC .. B62D 25/2036; B62D 33/044; B62D 21/03;
  E04B 2/761; F16B 7/18
  USPC .......................................................... 296/29
  See application file for complete search history.

(56) References Cited

U.S. PATENT DOCUMENTS

| | | | | |
|---|---|---|---|---|
| 5,116,161 | A * | 5/1992 | Faisst | E06B 3/5885 |
| | | | | 403/231 |
| 5,287,813 | A * | 2/1994 | Hanni | B61D 17/041 |
| | | | | 105/396 |
| 5,715,643 | A * | 2/1998 | Parkinson | B62D 27/026 |
| | | | | 403/231 |
| 6,094,802 | A * | 8/2000 | Rollin | E06B 3/9642 |
| | | | | 29/897 |
| 6,293,617 | B1 * | 9/2001 | Sukegawa | B62D 25/025 |
| | | | | 296/203.02 |
| 6,481,177 | B1 * | 11/2002 | Wood | F16B 12/50 |
| | | | | 403/231 |
| 6,623,067 | B2 * | 9/2003 | Gabbianelli | B62D 27/00 |
| | | | | 296/205 |
| 8,414,068 | B1 * | 4/2013 | Na | B62D 27/023 |
| | | | | 296/193.06 |
| 11,858,558 | B2 * | 1/2024 | Peng | B62D 31/02 |
| 2003/0152745 | A1 * | 8/2003 | Wagenblast | B29C 66/52451 |
| | | | | 428/122 |
| 2022/0177046 | A1 * | 6/2022 | Huang | B62D 27/065 |
| 2022/0177049 | A1 * | 6/2022 | Peng | B62D 27/02 |
| 2022/0177050 | A1 * | 6/2022 | Wang | B62D 21/03 |

FOREIGN PATENT DOCUMENTS

| | | | | |
|---|---|---|---|---|
| CN | 203996487 U | | 12/2014 | |
| CN | 105889241 A | | 8/2016 | |
| CN | 205780114 U | * | 12/2016 | ................ F16B 7/18 |
| CN | 206067936 U | | 4/2017 | |
| CN | 106864599 A | | 6/2017 | |
| CN | 108974144 A | | 12/2018 | |
| CN | 110040177 A | | 7/2019 | |
| EP | 0694701 A1 | | 1/1996 | |
| FR | 2587067 A1 | | 3/1987 | |
| KR | 100828835 B1 | * | 12/2006 | ............. B62D 31/02 |
| WO | WO-9207748 A1 | * | 5/1992 | ........... B62D 33/044 |

* cited by examiner

VEHICLE BODY FRAMEWORK CONNECTOR AND VEHICLE WITH SAME

CROSS-REFERENCE TO RELATED APPLICATIONS

The application is a bypass continuation application under 35 U.S.C. § 111 of PCT/CN2020/109160 having the international application filing date of Aug. 14, 2020, which claims priority to Chinese Patent Application No. 201910812425.5, entitled "BODY FRAME JOINT AND VEHICLE HAVING SAME", and filed by BYD Co., Ltd. on Aug. 30, 2019. The entire contents are incorporated herein by reference.

FIELD

The disclosure relates to the field of vehicle technologies, and more specifically, to a body frame joint and a vehicle having the same.

BACKGROUND

In related arts, body frames of vehicles such as commercial vehicles generally have beam structures, wherein transverse beams and longitudinal beams intersect and connect with each other. Junctions of the transverse beams and the longitudinal beams are further fixed by joints. Some joints among them are connected with two vertical surfaces of the transverse beams and the longitudinal beams only, resulting in the insufficient fatigue durability of the joints, the insufficient connection stiffness and large deformation. Except for connecting to the two vertical surfaces of the transverse beams and the longitudinal beams, some joints are connected with two side surfaces of the transverse beams and the longitudinal beams, which results in difficulty in assembling. In addition, the entire vehicle assembly requires relatively high accuracy. Some unavoidable factors such as manufacturing errors and assembly errors result in more cumbersome assembling, greatly affecting the assembly efficiency.

SUMMARY

The disclosure is intended to solve at least one of the technical problems in related arts.

An object of the disclosure is to provide a body frame joint. The body frame joint is high in connection strength and can be conveniently and efficiently assembled.

A vehicle having the afore-mentioned body frame joint is disclosed.

In order to achieve some of the afore-mentioned objects, an embodiment of a first aspect of the disclosure provides a body frame joint. The body frame joint includes: a first sub-joint; and a second sub-joint; wherein the first sub-joint and the second sub-joint are adapted to be mounted to a body frame; a transverse beam connection groove and a longitudinal beam connection groove are defined by engaging the first sub-joint and the second sub-joint; the transverse beam connection groove is adapted to accommodate a transverse beam of the body frame; and the longitudinal beam connection groove is adapted to accommodate a longitudinal beam of the body frame.

According to the body frame joint of the embodiment of the disclosure, the first sub-joint and the second sub-joint are disposed separately. The transverse beam connection groove and the longitudinal beam connection groove are defined by engaging the first sub joint and the second sub-joint. In this way, the transverse beam and the longitudinal beam can be positioned by the body frame joint in a plurality of directions, thereby improving the fatigue endurance, improving the connection stiffness, and reducing the deformation. In addition, since the connection stiffness is ensured, and the body frame joint includes a separated structure, the assembly manner has lower requirements for the vehicle assembly accuracy, is more convenient to operate, and can greatly improve the assembly efficiency.

In addition, the body frame joint according to the embodiments of the disclosure may further have the following additional technical features.

According to some specific embodiments of the disclosure, the first sub-joint includes a first transverse beam connecting plate, a first longitudinal beam connecting plate, and a first side plate. The first transverse beam connecting plate is connected with the first longitudinal beam connecting plate, and the first side plate is connected with a side of the first transverse beam connecting plate and the first longitudinal beam connecting plate away from the second sub-joint. The second sub joint includes a second transverse beam connecting plate, a second longitudinal beam connecting plate, and a second side plate. The second transverse beam connecting plate is connected with the second longitudinal beam connecting plate, and the second side plate is connected with a side of the second transverse beam connecting plate and the second longitudinal beam connecting plate away from the first sub-joint. The first transverse beam connecting plate and the second transverse beam connecting plate are engaged. The transverse beam connection groove is jointly defined by the first transverse beam connecting plate and the second transverse beam connecting plate as well as the first side plate and the second side plate. The first longitudinal beam connecting plate and the second longitudinal beam connecting plate are engaged. The longitudinal beam connection groove is jointly defined by the first longitudinal beam connecting plate and the second longitudinal beam connecting plate as well as the first side plate and the second side plate. The transverse beam and the longitudinal beam are sandwiched between the first side plate and the second side plate.

Further, the first transverse beam connecting plate, the first longitudinal beam connecting plate, and the first side plate are integrally formed, and the second transverse beam connecting plate, the second longitudinal beam connecting plate, and the second side plate are integrally formed.

According to some specific embodiments of the disclosure, the first transverse beam connecting plate and the first longitudinal beam connecting plate are perpendicular to the first side plate, the first longitudinal beam connecting plate and the second longitudinal beam connecting plate are perpendicular to the second side plate, and the first side plate is parallel to the second side plate.

According to some specific embodiments of the disclosure, the first transverse beam connecting plate and the first longitudinal beam connecting plate are vertically arranged, a junction of the first transverse beam connecting plate and the first longitudinal beam connecting plate is chamferred, and the first side plate is an L-shaped plate. The second transverse beam connecting plate and the second longitudinal beam connecting plate are vertically arranged, a junction of the second transverse beam connecting plate and the second longitudinal beam connecting plate is chamferred, and the second side plate is an L-shaped plate. The first side plate and the second side plate are of a same thickness, and the first transverse beam connecting plate, the first longitudinal beam connecting plate, the second transverse beam connecting plate, and the second longitudinal beam connecting plate are of a same thickness greater than the thickness of the first side plate and the second side plate.

According to some specific embodiments of the disclosure, the first side plate and the second side plate each are provided with countersunk screw holes. The first side plate is mounted to the transverse beam and the longitudinal beam by countersunk screws mated with the countersunk screw holes of the first side plate. The second side plate is mounted to the transverse beam and the longitudinal beam by countersunk screws mated with the countersunk screw holes of the second side plate. The countersunk screw holes are configured with slots, outer surfaces of the countersunk screws on the first side plate are flush with an outer surface of the first side plate, and outer surfaces of the countersunk screws on the second side plate are flush with an outer surface of the second side plate.

According to some specific embodiments of the disclosure, the transverse beam is configured with a first transverse sliding groove and a second transverse sliding groove, and the longitudinal beam is configured with a first longitudinal sliding groove and a second longitudinal sliding groove. The first transverse beam connecting plate is provided with a first transverse screw rod hole. A first transverse screw rod is mated with the first transverse screw rod hole. A first transverse collar is riveted on the first transverse screw rod, and the first transverse screw rod is slidably mated with the first transverse sliding groove. The second transverse beam connecting plate is provided with a second transverse screw rod hole. A second transverse screw rod is mated with the second transverse screw rod hole. A second transverse collar is riveted on the second transverse screw rod, and the second transverse screw rod is slidably mated with the second transverse sliding groove. The first longitudinal beam connecting plate is provided with a first longitudinal screw rod hole. A first longitudinal screw rod is mated with the first longitudinal screw rod hole. A first longitudinal collar is riveted on the first longitudinal screw rod, and the first longitudinal screw rod is slidably mated with the first longitudinal sliding groove. The second longitudinal beam connecting plate is provided with a second longitudinal screw rod hole. A second longitudinal screw rod is mated with the second longitudinal screw rod hole. A second longitudinal collar is riveted on the second longitudinal screw rod, and the second longitudinal screw rod is slidably mated with the second longitudinal sliding groove.

Further, a first transverse gasket between the first transverse screw rod and the first transverse beam connecting plate is sleeved on the first transverse screw rod. The first transverse gasket is slidably mated with the first transverse sliding groove. A second transverse gasket between the second transverse screw rod and the second transverse beam connecting plate is sleeved on the second transverse screw rod. The second transverse gasket is slidably mated with the second transverse sliding groove. A first longitudinal gasket between the first longitudinal screw rod and the first longitudinal beam connecting plate is sleeved on the first longitudinal screw rod. The first longitudinal gasket is slidably mated with the first longitudinal sliding groove. A second longitudinal gasket between the second longitudinal screw rod and the second longitudinal beam connecting plate is sleeved on the second longitudinal screw rod. The second longitudinal gasket is slidably mated with the second longitudinal sliding groove.

According to some specific embodiments of the disclosure, an inner side surface of the first transverse beam connecting plate and an inner side surface of the first longitudinal beam connecting plate are provided with a first inner rib. The first inner rib on the first transverse beam connecting plate is connected with the first inner rib on the first longitudinal beam connecting plate by a first corner rib provided at the junction of the first transverse beam connecting plate and the first longitudinal beam connecting plate. An inner side surface of the second transverse beam connecting plate and an inner side surface of the second longitudinal beam connecting plate are provided with a second inner rib. The second inner rib on the second transverse beam connecting plate is connected with the second inner rib on the second longitudinal beam connecting plate by a second corner rib provided at the junction of the second transverse beam connecting plate and the second longitudinal beam connecting plate. A thickness of the first corner rib is greater than a thickness of the first inner rib. A thickness of the second corner rib is greater than a thickness of the second inner rib.

According to some specific embodiments of the disclosure, the first inner rib on the first transverse beam connecting plate is at a central position of the first transverse beam connecting plate in a width direction, the second inner rib on the second transverse beam connecting plate is at a central position of the second transverse beam connecting plate in a width direction, the first inner rib on the first longitudinal beam connecting plate is at a central position of the first longitudinal beam connecting plate in a width direction, and the second inner rib on the second longitudinal beam connecting plate is at a central position of the second longitudinal beam connecting plate in a width direction.

According to some specific embodiments of the disclosure, the first transverse screw rod hole is configured extending through the first inner rib on the first transverse beam connecting plate, and the first inner rib on the first transverse beam connecting plate is mated with the first transverse sliding groove. The first longitudinal screw rod hole is configured extending through the first inner rib on the first longitudinal beam connecting plate, and the first inner rib on the first longitudinal beam connecting plate is mated with the first longitudinal sliding groove. The first corner rib is mated with a junction of the first transverse sliding groove and the first longitudinal sliding groove.

The second transverse screw rod hole is configured extending through the second inner rib on the second transverse beam connecting plate. The second inner rib on the second transverse beam connecting plate is mated with the second transverse sliding groove. The second longitudinal screw rod hole is configured extending through the second inner rib on the second longitudinal beam connecting plate. The second inner rib on the second longitudinal beam connecting plate is mated with the second longitudinal sliding groove. The second corner rib is mated with a junction of the second transverse sliding groove and the second longitudinal sliding groove.

According to some specific embodiments of the disclosure, an outer side surface of the first transverse beam connecting plate and an outer side surface of the first longitudinal beam connecting plate are provided with a first outer rib provided at the junction of the first transverse beam connecting plate and the first longitudinal beam connecting plate, and the first outer rib is rounded. An outer side surface of the second transverse beam connecting plate and an outer side surface of the second longitudinal beam connecting plate are provided with a second outer rib provided at the junction of the second transverse beam connecting plate and the second longitudinal beam connecting plate, and the second outer rib is rounded.

According to some specific embodiments of the disclosure, a plurality of first outer ribs are provided and arranged spaced apart along a width direction of the first transverse beam connecting plate and the first longitudinal beam connecting plate, and a plurality of second outer ribs are provided and arranged spaced apart from each other along a width direction of the second transverse beam connecting plate and the second longitudinal beam connecting plate.

An embodiment of a second aspect of the disclosure provides a vehicle. The vehicle according to this embodiment of the disclosure includes the body frame joint according to the embodiment of the first aspect of the disclosure and a body frame. The body frame has a transverse beam and a longitudinal beam. The transverse beam is connected with the longitudinal beam.

The vehicle according to the embodiment of the disclosure has the advantages such as a stable structure and high production efficiency.

Other aspects and advantages of the disclosure will be given in the following description, some of which will become apparent from the following description or may be learned from practices of the disclosure.

BRIEF DESCRIPTION OF THE DRAWINGS

The above and/or additional aspects and advantages of the disclosure will become apparent and comprehensible in the description of the embodiments taken in conjunction with the accompanying drawings.

In the drawings.

Figure 1:
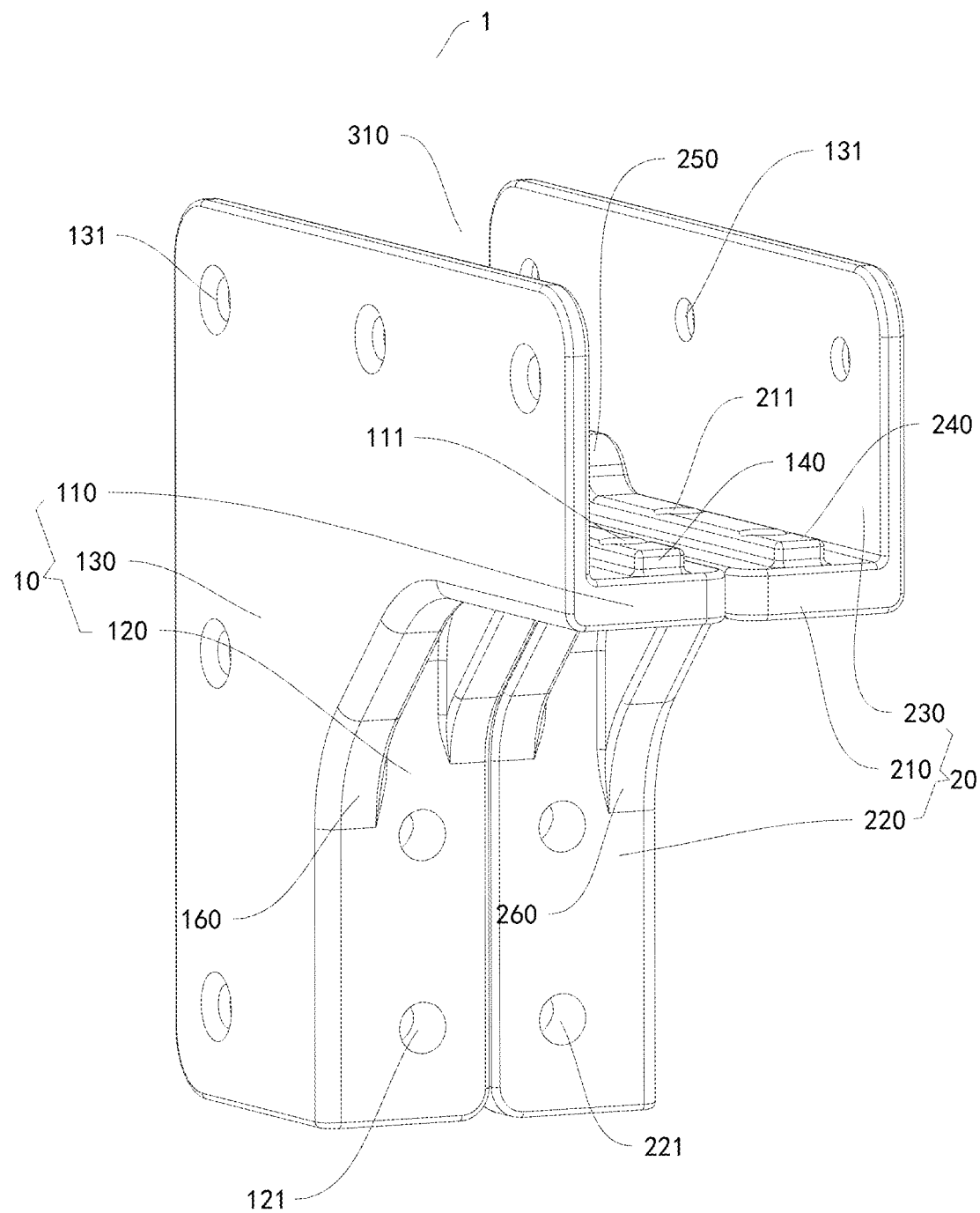
FIG. 1 is a schematic structural diagram of a first sub joint and a second sub-joint of a body frame joint according to an embodiment of the disclosure.

Body frame joint 1, Vehicle 2,

First sub joint 10, First transverse beam connecting plate 110, First longitudinal beam connecting plate 120, First side plate 130, Countersunk screw hole 131, First transverse screw rod hole 111, First transverse screw rod 112, First transverse collar 113, First longitudinal screw rod hole 121, First longitudinal screw rod 122, First longitudinal collar 123, First transverse gasket 114, First longitudinal gasket 124, First inner rib 140, First corner rib 150, First outer rib 160, Second sub joint 20, Second transverse beam connecting plate 210, Second longitudinal beam connecting plate 220, Second side plate 230, Countersunk screw hole 231, Second transverse screw rod hole 211, Second transverse screw rod 212, Second transverse collar 213, Second longitudinal screw rod hole 221, Second longitudinal screw rod 222, Second longitudinal collar 223, Second transverse gasket 214, Second longitudinal gasket 224, Second inner rib 240, Second corner rib 250, Second outer rib 260, Transverse beam 30, Transverse beam connection groove 310, First transverse sliding groove 320, Second transverse sliding groove 330, Longitudinal beam 40, First longitudinal sliding groove 420, Second longitudinal sliding groove 430.

DETAILED DESCRIPTION

Embodiments of the disclosure are described in detail below, and examples of the embodiments are shown in the accompanying drawings. Wherein the same or similar reference numerals indicate the same or similar elements or elements having the same or a similar function throughout the disclosure. The embodiments described below with reference to the accompanying drawings are exemplary, and are intended to explain the disclosure and cannot be construed as a limitation on the disclosure.

A vehicle 2 according to the embodiments of the disclosure is described below with reference to the accompanying drawings.

As shown in FIG. 1 to FIG. 8, the vehicle 2 according to the embodiments of the disclosure includes a body frame and a body frame joint 1.

The body frame has a transverse beam 30 and a longitudinal beam 40. The transverse beam 30 is connected with the longitudinal beam 40. The transverse beam 30 and the longitudinal beam 40 may be made of an aluminum alloy material.

The body frame joint 1 according to the embodiment of the disclosure is first described with reference to the accompanying drawings.

As shown in FIG. 1 to FIG. 2 and FIG. 5 to FIG. 6, the body frame joint 1 according to the embodiments of the disclosure includes a first sub-joint 10 and a second sub-joint 20.

The first sub-joint 10 and the second sub-joint 20 are adapted to be mounted to a body frame, and are specifically mounted to a junction of the transverse beam 30 and the longitudinal beam 40. A transverse beam connection groove 310 and a longitudinal beam connection groove (not shown in the figures) are defined by engaging the first sub-joint 10 and the second sub joint 20. The transverse beam connection groove 310 is adapted to accommodate the transverse beam 30 of the body frame, and the longitudinal beam connection groove is adapted to accommodate the longitudinal beam 40 of the body frame.

It should be noted that the term "engagement" in the disclosure means that the first sub-joint 10 and the second sub-joint 20 face each other. The two sub-joints are engaged and the transverse beam connection groove 310 and the longitudinal beam connection groove are defined. The engagement of the first sub-joint 10 and the second sub-joint 20 may be understood as the first sub-joint 10 and the second sub-joint 20 facing each other and attached to each other. Obviously, the disclosure is not limited thereto. The engagement of the first sub joint 10 and the second sub-joint 20 may further be understood as the first sub-joint 10 and the second sub-joint 20 facing each other and spaced apart from each other, as long as the transverse beam connection groove 310 and the longitudinal beam connection groove can be jointly defined when the first sub-joint 10 and the second sub-joint 20 face each other.

For example, the first sub-joint 10 and the second sub-joint 20 are arranged in a width direction of the body frame joint 1. The first sub-joint 10 and the second sub-joint 20 are respectively connected with the transverse beam 30 and the longitudinal beam 40, and the first sub-joint 10 and the second sub-joint 20 are in mirror symmetry with respect to a central plane of the body frame joint 1. The transverse beam connection groove 310 and the longitudinal beam connection groove are in communication with each other and may be vertically provided. The transverse beam connection groove 310 extends in a length direction of the vehicle 2, and has an opening facing the transverse beam 30 of the vehicle 2. The longitudinal beam connection groove extends in a height direction of the vehicle 2, and has an opening facing the longitudinal beam 40 of the vehicle 2.

According to the body frame joint 1 of the embodiment of the disclosure, the first sub-joint 10 and the second sub-joint 20 are disposed separately. Therefore, the body frame joint 1 can have a relatively simple structure and can be conveniently mounted, and die sinking of the single casting (the first sub joint 10 and the second sub joint 20) can be easily performed, improving the production efficiency.

In addition, the transverse beam connection groove 310 and the longitudinal beam connection groove are defined by engaging the first sub-joint 10 and the second sub-joint 20. Therefore, the transverse beam connection groove 310 can be used to accommodate the transverse beam 30, and the longitudinal beam connection groove can be used to accommodate the longitudinal beam 40. In this way, the transverse beam 30 and the longitudinal beam 40 can be positioned by the body frame joint 1 in a plurality of directions, thereby improving the fatigue endurance, thereby improving the connection stiffness, and reducing the deformation.

In addition, since the connection stiffness is ensured, and the body frame joint 1 is a separated structure, the first sub-joint 10 and the second sub-joint 20 can be mounted separately and finally engaged and sandwiched at a junction of the transverse beam 30 and the longitudinal beam 40 during assembling. The assembly manner has lower requirements for the vehicle assembly accuracy, more convenient operations, and can greatly improve the assembly efficiency.

Therefore, the vehicle 2 and the body frame joint 1 according to the embodiment of the disclosure not only has high connection strength, but also has the advantages such as convenient processing, a simple structure, high production efficiency, and the like.

According to some specific embodiments of the disclosure, as shown in FIG. 1 to FIG. 6, the first sub joint 10 includes a first transverse beam connecting plate 110, a first longitudinal beam connecting plate 120, and a first side plate 130.

The first transverse beam connecting plate 110 is connected with the first longitudinal beam connecting plate 120, and the first side plate 130 is connected with a side of the first transverse beam connecting plate 110 and the first longitudinal beam connecting plate 120 away from the second sub-joint 20.

The second sub-joint 20 includes a second transverse beam connecting plate 210, a second longitudinal beam connecting plate 220, and a second side plate 230.

The second transverse beam connecting plate 210 is connected with the second longitudinal beam connecting plate 220, and the second side plate 230 is connected with a side of the second transverse beam connecting plate 210 and the second longitudinal beam connecting plate 220 away from the first sub-joint 10.

The first transverse beam connecting plate 110 and the second transverse beam connecting plate 210 are engaged. The transverse beam connection groove 310 is jointly defined by the first transverse beam connecting plate and the second transverse beam connecting plate as well as the first side plate 130 and the second side plate 230. The first longitudinal beam connecting plate 120 and the second longitudinal beam connecting plate 220 are engaged. The longitudinal beam connection groove is jointly defined by the first longitudinal beam connecting plate and the second longitudinal beam connecting plate as well as the first side plate 130 and the second side plate 230. The transverse beam 30 and the longitudinal beam 40 are sandwiched between the first side plate 130 and the second side plate 230.

For example, the first transverse beam connecting plate 110, the first longitudinal beam connecting plate 120, and the first side plate 130 may be integrally formed. The second transverse beam connecting plate 210, the second longitudinal beam connecting plate 220, and the second side plate 230 may be integrally formed. The first sub joint 10 and the second sub joint 20 may be made of an aluminum alloy material. The first transverse beam connecting plate 110 and the first longitudinal beam connecting plate 120 may be perpendicular to the first side plate 130. The second transverse beam connecting plate 210 and the second longitudinal beam connecting plate 220 may be perpendicular to the second side plate 230. The first side plate 130 may be parallel to the second side plate 230. In this way, the body frame joint 1 is connected with inner and outer surfaces and lower surfaces of the transverse beam 30 and inner and outer surfaces and one side surface of the longitudinal beam 40, which is stable and reliable, so that the stiffness and strength are improved, and the connection strength of the body frame is improved. The first sub joint 10 and the second sub-joint 20 are made of an aluminum alloy material, so that the overall weight of the vehicle 2 can be reduced.

Further, as shown in FIG. 1 to FIG. 7, the first transverse beam connecting plate 110 and the first longitudinal beam connecting plate 120 are vertically arranged, a junction of the first transverse beam connecting plate and the first longitudinal beam connecting plate is chamferred, and the first side plate 130 is an L-shaped plate. The second transverse beam connecting plate 210 and the second longitudinal beam connecting plate 220 are vertically arranged, a junction of the second transverse beam connecting plate and the second longitudinal beam connecting plate is chamferred, and the second side plate 230 is an L-shaped plate. In this way, the connection transition between the first transverse beam connecting plate 110 and the first longitudinal beam connecting plate 120 is smooth, and the connection transition between the second transverse beam connecting plate 210 and the second longitudinal beam connecting plate 220 is smooth. The first side plate 130 and the second side plate 230 are L-shaped plates, that is, it is ensured that a connection area between the first side plate and the second side plate and the body frame, thereby saving materials.

Still further, as shown in FIG. 1 to FIG. 5, the first side plate 130 and the second side plate 230 are of a same thickness, and the first transverse beam connecting plate 110, the first longitudinal beam connecting plate 120, the second transverse beam connecting plate 210, and the second longitudinal beam connecting plate 220 are of a same thickness greater than the thickness of the first side plate 130 and the second side plate 230. In this way, the requirements for the strength and the stiffness of the body frame joint 1 can be satisfied, and the structure of the body frame joint 1 can be adjusted according to the actual situation of the body frame.

According to some specific embodiments of the disclosure, as shown in FIG. 2 and FIG. 5 to FIG. 7, the first side plate 130 and the second side plate 230 each are provided with countersunk screw holes 131. The first side plate 130 is mounted to the transverse beam 30 and the longitudinal beam 40 by countersunk screws 231 mated with the countersunk screw holes 131, and the second side plate 230 is mounted to the transverse beam 30 and the longitudinal beam 40 by the countersunk screws 231 mated with the countersunk screw holes 131.

Specifically, the countersunk screw holes 131 are configured with slots, an outer surface of the countersunk screws 231 on the first side plate 130 is flush with the outer surface of the first side plate 130, and the outer surface of the countersunk screws 231 on the second side plate 230 is flush with the outer surface of the second side plate 230.

For example, a side surface of the first side plate 130 facing the second side plate 230 and a side surface of the second side plate 230 facing the first side plate 130 are respectively connected with two opposite sides of the transverse beam 30 and the longitudinal beam 40 in the width direction of the vehicle 2. For example, the side surface of the first side plate 130 facing the second side plate 230 is connected with a side of the transverse beam 30 and the longitudinal beam 40 facing an outer side of the vehicle 2, and the side surface of the second side plate 230 facing the first side plate 130 is connected with a side of the transverse beam 30 and the longitudinal beam 40 facing an inner side of the vehicle 2. In this way, the connection area between the body frame joint 1 and the body frame is increased, and the connection strength is improved. The mating of the countersunk screws 231 and the countersunk screw holes 131 does not affect the interior decoration arrangement inside the vehicle.

Figure 5:
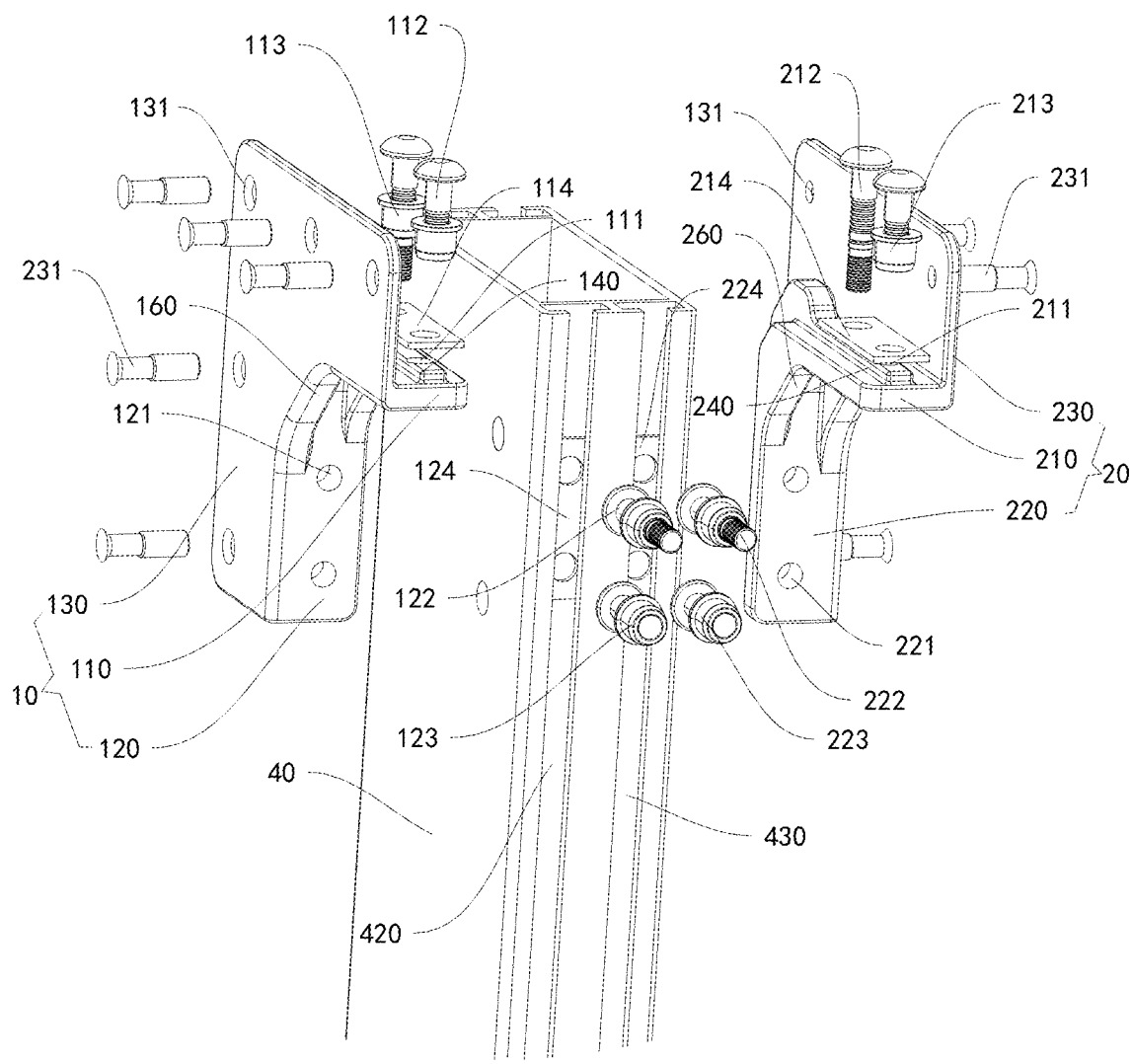
FIG. 5 is a schematic diagram of a connection between a body frame joint and a longitudinal beam according to an embodiment of the disclosure.
Figure 6:
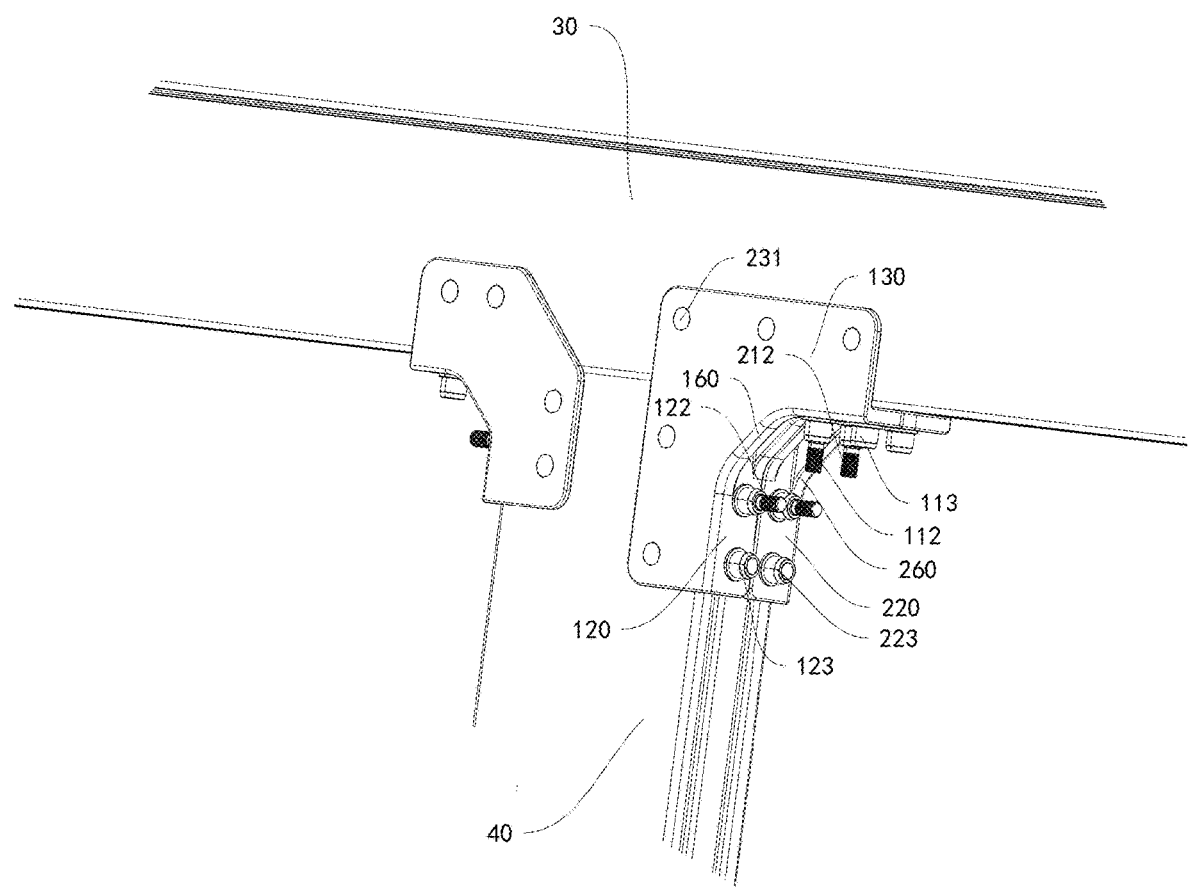
FIG. 6 is a schematic diagram of a connection between a body frame joint and a body frame according to an embodiment of the disclosure.
Figure 7:
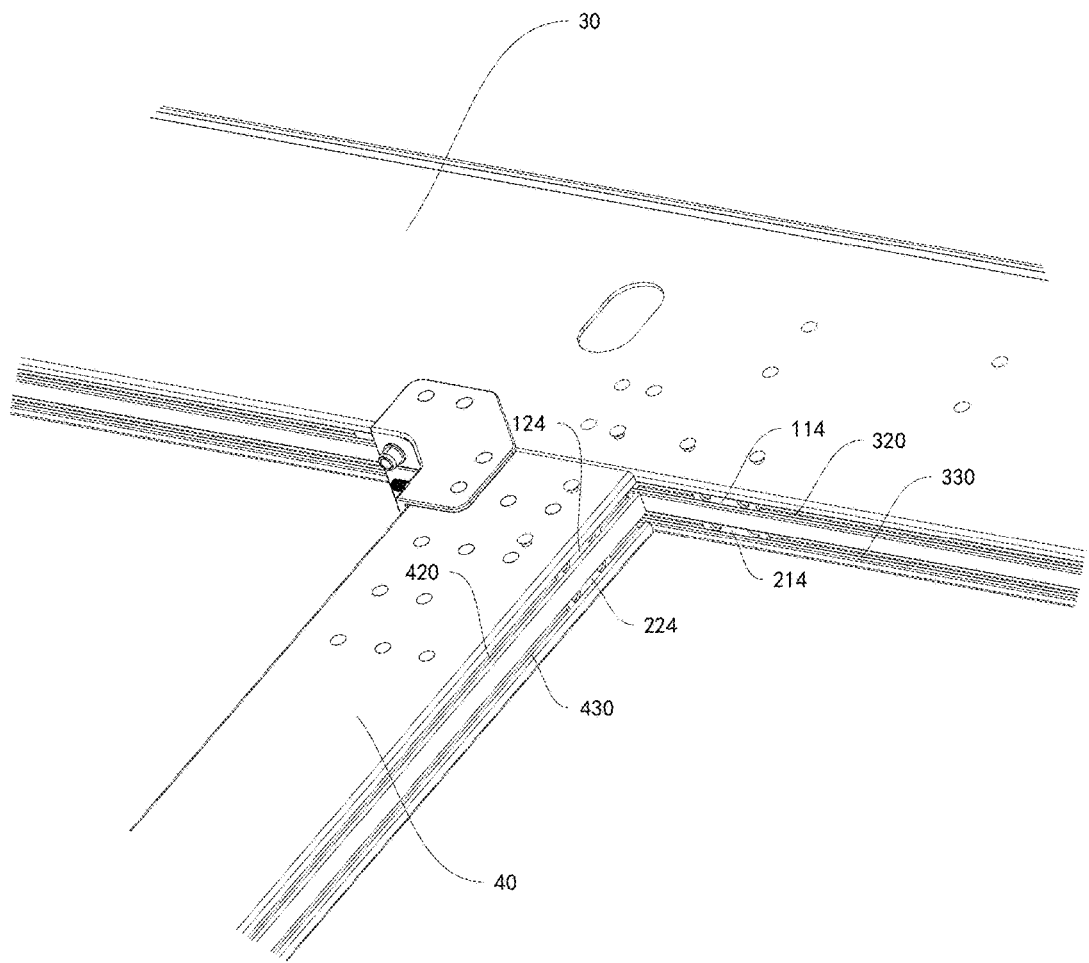
FIG. 7 is a schematic structural diagram of a transverse beam and a longitudinal beam of a vehicle according to an embodiment of the disclosure.
Figure 8:
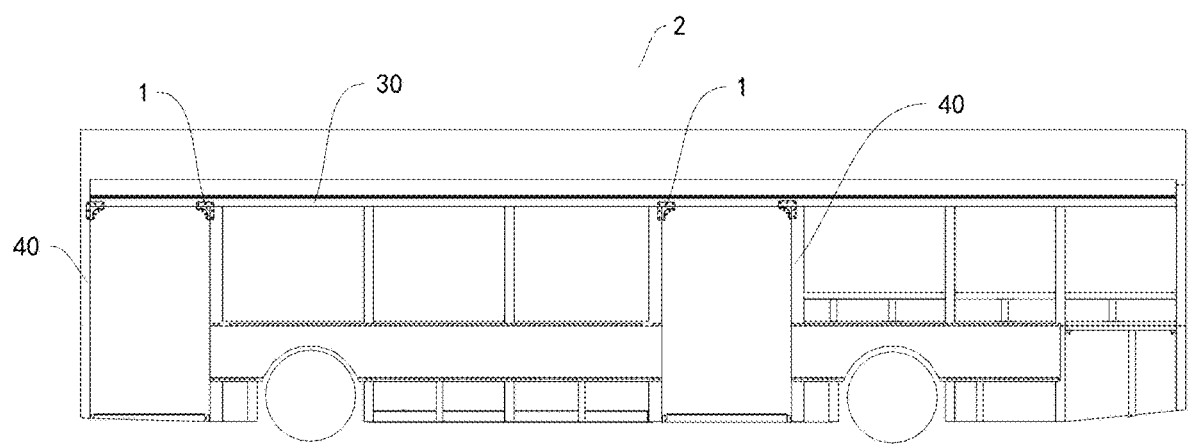
FIG. 8 is a schematic structural diagram of a vehicle according to an embodiment of the disclosure.

According to some embodiments of the disclosure, as shown in FIG. 5 to FIG. 7, the transverse beam 30 is configured with a first transverse sliding groove 320 and a second transverse sliding groove 330, and the longitudinal beam 40 is configured with a first longitudinal sliding groove 420 and a second longitudinal sliding groove 430. The first transverse sliding groove 320 and the second transverse sliding groove 330 extend in the length direction of the vehicle 2, and the first longitudinal sliding groove 420 and the second longitudinal sliding groove 430 extend in the height direction of the vehicle 2.

The first transverse beam connecting plate 110 is provided with a first transverse screw rod hole 111. A first transverse screw rod 112 is mated with the first transverse screw rod hole 111, and a first transverse collar 113 is riveted on the first transverse screw rod 112. The first transverse screw rod 112 is slidably mated with the first transverse sliding groove 320. The second transverse beam connecting plate 210 is provided with a second transverse screw rod hole 211. A second transverse screw rod 212 is mated with the second transverse screw rod hole 211, and a second transverse collar 213 is riveted on the second transverse screw rod 212. The second transverse screw rod 212 is slidably mated with the second transverse sliding groove 330.

The first longitudinal beam connecting plate 120 is provided with a first longitudinal screw rod hole 121. A first longitudinal screw rod 122 is mated with the first longitudinal screw rod hole 121, and a first longitudinal collar 123 is riveted on the first longitudinal screw rod 122. The first longitudinal screw rod 122 is slidably mated with the first longitudinal sliding groove 420. The second longitudinal beam connecting plate 220 is provided with a second longitudinal screw rod hole 221. A second longitudinal screw rod 222 is mated with the second longitudinal screw rod hole 221, and a second longitudinal collar 223 is riveted on the second longitudinal screw rod 222. The second longitudinal screw rod 222 is slidably mated with the second longitudinal sliding groove 430.

In this way, by means of the connection by using double sliding grooves, the connection strength can be improved, and the deformation and the vibration of the vehicle can be reduced, thereby improving the durability of the vehicle. Moreover, it is convenient to adjust the position of the body frame joint 1 during the mounting, and the assembly operation is also more convenient.

Figure 2:
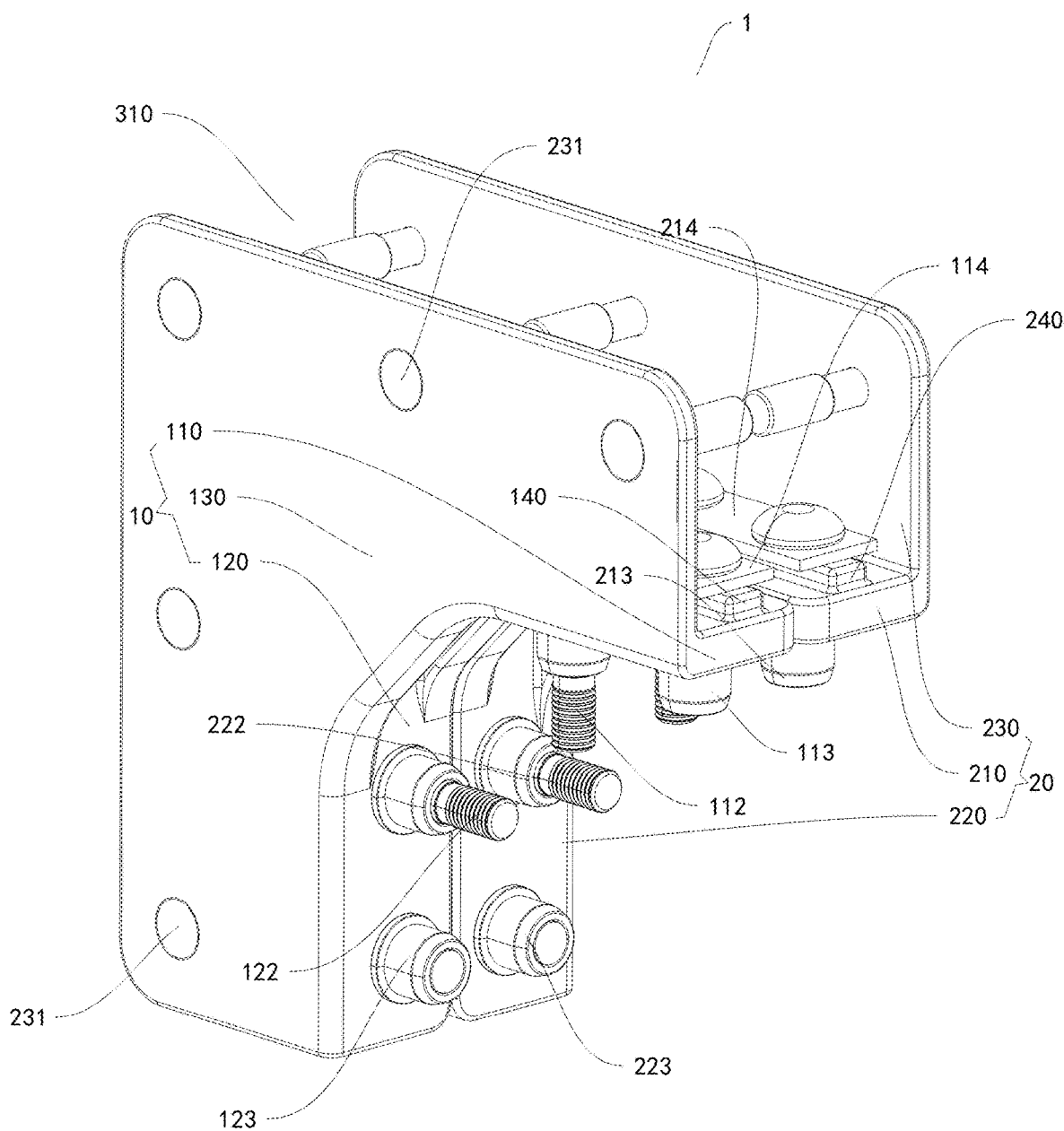
FIG. 2 is a schematic structural diagram of a body frame joint according to an embodiment of the disclosure.
Figure 3:
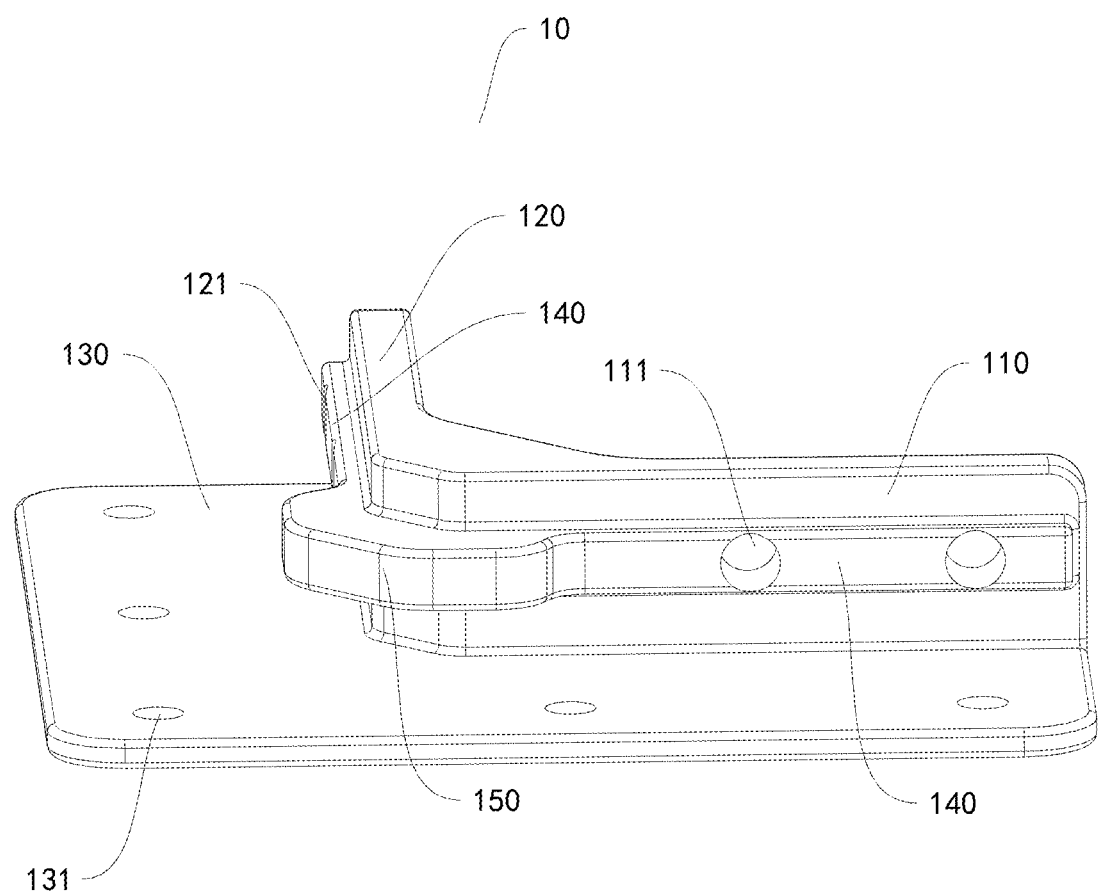
FIG. 3 is a schematic structural diagram of a first sub joint of a body frame joint according to an embodiment of the disclosure.
Figure 4:
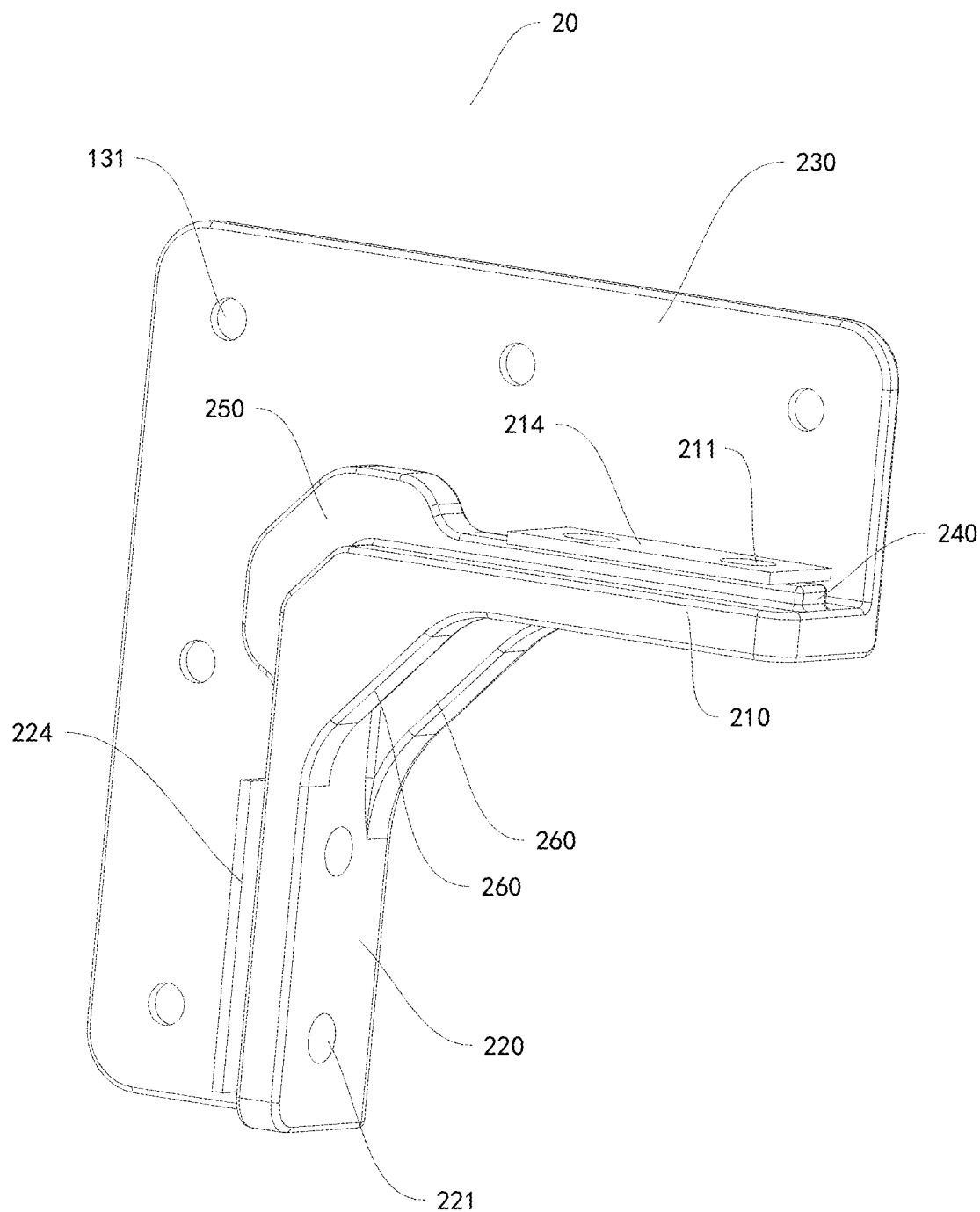
FIG. 4 is a schematic structural diagram of a second sub joint of a body frame joint according to an embodiment of the disclosure.

Further, as shown in FIG. 2 and FIG. 5, a first transverse gasket 114 between the first transverse screw rod 112 and the first transverse beam connecting plate 110 is sleeved on the first transverse screw rod 112. The first transverse gasket 114 is slidably mated with the first transverse sliding groove 320. A second transverse gasket 214 between the second transverse screw rod 212 and the second transverse beam connecting plate 210 is sleeved on the second transverse screw rod 212. The second transverse gasket 214 is slidably mated with the second transverse sliding groove 330. The first transverse gasket 114 and the second transverse gasket 214 may be made of an aluminum alloy material.

A first longitudinal gasket 124 between the first longitudinal screw rod 122 and the first longitudinal beam connecting plate 120 is sleeved on the first longitudinal screw rod 122. The first longitudinal gasket 124 is slidably mated with the first longitudinal sliding groove 420. A second longitudinal gasket 224 between the second longitudinal screw rod 222 and the second longitudinal beam connecting plate 220 is sleeved on the second longitudinal screw rod 222. The second longitudinal gasket 224 is slidably mated with the second longitudinal sliding groove 430. The first longitudinal gasket 124 and the second longitudinal gasket 224 may be made of an aluminum alloy material.

For example, the first transverse gasket 114, the first longitudinal gasket 124, the second transverse gasket 214, and the second longitudinal gasket 224 each may be an aluminum alloy sheet. The first transverse gasket, the first longitudinal gasket, the second transverse gasket, and the second longitudinal gasket are provided with a through hole on a center line for mounting the first transverse screw rod 112, the first longitudinal screw rod 122, the second transverse screw rod 212, and the second longitudinal screw rod 222. Sizes of the through holes may be increased or decreased according to actual conditions. After the mounting is finished, the first transverse gasket 114, the first longitudinal gasket 124, the second transverse gasket 214, and the second longitudinal gasket 224 are respectively attached to bottoms of the first transverse sliding groove 320, the first longitudinal sliding groove 420, the second transverse sliding groove 330, and the second longitudinal sliding groove 430.

The first transverse gasket 114, the first longitudinal gasket 124, the second transverse gasket 214, and the second longitudinal gasket 224 are made of the aluminum alloy material, so that the weight of the vehicle can be effectively reduced. In addition, when the transverse beam 30 and the longitudinal beam 40 are stressed, loads are applied to contact surfaces of the first transverse gasket 114, the first longitudinal gasket 124, the second transverse gasket 214, and the second longitudinal gasket 224 with the first transverse sliding groove 320, the first longitudinal sliding groove 420, the second transverse sliding groove 330, and the second longitudinal sliding groove 430. Therefore, the stress concentration of the first transverse sliding groove 320, the first longitudinal sliding groove 420, the second transverse sliding groove 330, and the second longitudinal sliding groove 430 can be reduced, so that the requirements for the strength and the deformation of the body frame can be satisfied.

According to some embodiments of the disclosure, as shown in FIG. 2 and FIG. 5 to FIG. 7, the first transverse screw rod hole 111 on the first transverse beam connecting plate 110 includes a plurality of first transverse screw rod holes, the second transverse screw rod hole 211 on the second transverse beam connecting plate 210 includes a plurality of second transverse screw rod holes, the first longitudinal screw rod 122 on the first longitudinal beam connecting plate 120 includes a plurality of first longitudinal screw rods, and the second longitudinal screw rod 222 on the second longitudinal beam connecting plate 220 includes a plurality of second longitudinal screw rods.

According to some specific embodiments of the disclosure, as shown in FIG. 1 to FIG. 5, an inner side surface of the first transverse beam connecting plate 110 and an inner side surface of the first longitudinal beam connecting plate 120 are provided with a first inner rib 140. The first inner rib 140 on the first transverse beam connecting plate 110 is connected with the first inner rib 140 on the first longitudinal beam connecting plate 120 by a first corner rib 150 provided at a junction of the first transverse beam connecting plate 110 and the first longitudinal beam connecting plate 120.

An inner side surface of the second transverse beam connecting plate 210 and an inner side surface of the second longitudinal beam connecting plate 220 are provided with a second inner rib 240. The second inner rib 240 on the second transverse beam connecting plate 210 is connected with the second inner rib 240 on the second longitudinal beam connecting plate 220 by a second corner rib 250 provided at a junction of the second transverse beam connecting plate 210 and the second longitudinal beam connecting plate 220.

Specifically, a thickness of the first corner rib 150 is greater than a thickness of the first inner rib 140, and a thickness of the second corner rib 250 is greater than a thickness of the second inner rib 240.

Further, as shown in FIG. 1 to FIG. 5, the first inner rib 140 on the first transverse beam connecting plate 110 is at a central position of the first transverse beam connecting plate 110 in a width direction, the second inner rib 240 on the second transverse beam connecting plate 210 is at a central position of the second transverse beam connecting plate 210 in a width direction, the first inner rib 140 on the first longitudinal beam connecting plate 120 is at a central position of the first longitudinal beam connecting plate 120 in a width direction, and the second inner rib 240 on the second longitudinal beam connecting plate 220 is at a central position of the second longitudinal beam connecting plate 220 in a width direction.

In this way, by means of the arrangement of the first inner rib 140, the second inner rib 240, the first corner rib 150, and the second corner rib 250, the body frame joint 1 has a compact structure, high structural strength, good connection strength, and high durability. The first inner rib 140, the first corner rib 150, the second inner rib 240, and the second corner rib 250 are respectively provided at the width center of the first transverse beam connecting plate 110, the first longitudinal beam connecting plate 120, the second transverse beam connecting plate 210, and the second longitudinal beam connecting plate 220, so that the body frame joint 1 is stressed uniformly and reasonably and has higher structural strength.

According to some embodiments of the disclosure, as shown in FIG. 1 to FIG. 7, the first transverse screw rod hole 111 is configured extending through the first inner rib 140 on the transverse beam connecting plate 110. The first inner rib 140 on the transverse beam connecting plate 110 is mated with the first transverse sliding groove 320. The first longitudinal screw rod hole 121 is configured extending through the first inner rib 140 on the longitudinal beam connecting plate 120. The first inner rib 140 on the longitudinal beam connecting plate 120 is mated with the first longitudinal sliding groove 420. The first corner rib 150 is mated with a junction of the first transverse sliding groove 320 and the first longitudinal sliding groove 420.

The second transverse screw rod hole 211 is configured extending through the second inner rib 240 on the second transverse beam connecting plate 210. The second inner rib 240 on the transverse beam connecting plate 210 is mated with the second transverse sliding groove 330. The second longitudinal screw rod hole 221 is configured extending through the second inner rib 240 on the second longitudinal beam connecting plate 220. The second inner rib 240 on the second longitudinal beam connecting plate 220 is mated with the second longitudinal sliding groove 430. The second corner rib 250 is mated with a junction of the second transverse sliding groove 330 and the second longitudinal sliding groove 430.

In this way, not only the connection strength between the body frame joint 1 and the body frame but also the structural strength of the body frame joint 1 are improved. The first corner rib 150 is inserted into the first transverse sliding groove 320 and the first longitudinal sliding groove 420. The second corner rib 250 is inserted into the second transverse sliding groove 330 and the second longitudinal sliding groove 430. In this way, the body frame joint 1 is constrained, thereby improving the torsion resistance of the body frame joint 1. The first inner rib 140 is inserted into the first transverse sliding groove 320 and the first longitudinal sliding groove 420. The second inner rib 240 is inserted into the second transverse sliding groove 330 and the second longitudinal sliding groove 430. In this way, the body frame joint 1, the transverse beam 30, and the longitudinal beam 40 jointly resist the deformation, thereby improving the entire stiffness of the vehicle 2.

According to some embodiments of the disclosure, as shown in FIG. 1 to FIG. 7, an outer side surface of the first transverse beam connecting plate 110 and an outer side surface of the first longitudinal beam connecting plate 120 are provided with a first outer rib 160 provided at the junction of the first transverse beam connecting plate and the first longitudinal beam connecting plate, and the first outer rib is rounded. An outer side surface of the second transverse beam connecting plate 210 and an outer side surface of the second longitudinal beam connecting plate 220 are provided with a second outer rib 260 provided at the junction of the second transverse beam connecting plate and the second longitudinal beam connecting plate, and the second outer rib is rounded.

In other words, the first outer rib 160 connects the first transverse beam connecting plate 110 to the first longitudinal beam connecting plate 120, and the second outer rib 260 connects the second transverse beam connecting plate 210 and the second longitudinal beam connecting plate 220. A part of the first outer rib 160 connected with the first transverse beam connecting plate 110 and the first longitudinal beam connecting plate 120 is rounded, and a part of the second outer rib 260 connected with the second transverse beam connecting plate 210 and the second longitudinal beam connecting plate 220 is rounded. In this way, the connection transition is smooth, and the fillet radius is maximized to reduce the stress concentration at the connection position.

Further, as shown in FIG. 1 to FIG. 5, a plurality of first outer ribs are provided and arranged spaced apart from each other along a width direction of the first transverse beam connecting plate 110 and the first longitudinal beam connecting plate 120, and a plurality of second outer ribs are provided and arranged spaced apart from each other along a width direction of the second transverse beam connecting plate 210 and the second longitudinal beam connecting plate 220.

For example, the first outer rib 160 includes two first outer ribs. One of the first outer ribs is disposed on a side close to the second sub joint 20. An outside plane of the one first outer rib 160 is flush with an outside plane of the first side plate 130 of the first sub joint 10. Another one of the first outer ribs is disposed on a side away from the second sub joint 20. An outside plane of the another first outer rib 160 is flush with a side edge of the first transverse beam connecting plate 110 of the first sub joint 10 away from the first side plate 130. A size of the one first outer rib 160 is less than a size of the another first outer rib 160. The second outer rib 260 includes two second outer ribs. One of the second outer ribs is disposed on a side close to the first sub-joint 10. An outside plane of the one second outer rib 260 is flush with an outside plane of the second side plate 230 of the second sub joint 20. Another one of the first outer ribs is disposed on a side away from the first sub joint 10. An outside plane of the another first outer rib 260 is flush with a side edge of the first longitudinal beam connecting plate 120 of the second sub joint 20 away from the second side plate 230. A size of the one second outer rib 260 is less than a size of the another second outer rib 260.

In this way, the structure strength, the durability, and the torsion resistance of the body frame joint 1 are improved, and the stress concentration at corner positions of the body frame joint 1 is reduced. The sizes of the first outer rib 160 and the second outer rib 260 are designed to facilitate the formation of the first transverse screw rod hole 111, the first longitudinal screw rod hole 121, the second transverse screw rod hole 211, and the second longitudinal screw rod hole 221 in the first transverse beam connecting plate 110, the first longitudinal beam connecting plate 120, the second transverse beam connecting plate 210, and the second longitudinal beam connecting plate 220.

A process of connecting the body frame joint 1 to the body frame is described below.

First, the first transverse gasket 114 is sleeved in the first transverse screw rod 112, the first longitudinal gasket 124 is sleeved in the first longitudinal screw rod 122, the second transverse gasket 214 is sleeved in the second transverse screw rod 212, and the second longitudinal gasket 224 is sleeved in the second longitudinal screw rod 222. Then, the first transverse screw rod 112 and the second transverse screw rod 212 with the gaskets are respectively slid into the first transverse sliding groove 320 and the second transverse sliding groove 330 of the transverse beam 30, and the first longitudinal screw rod 122 and the second longitudinal screw rod 222 with the gaskets are respectively slid into the first longitudinal sliding groove 420 and the second longitudinal sliding groove 430 of the longitudinal beam 40.

Then, the first sub joint 10 is sleeved into the first longitudinal screw rod 122 and the first transverse screw rod 112, the first longitudinal collar 123 is riveted on the first longitudinal screw rod 122, and the first transverse collar 113 is riveted on the first transverse screw rod 112. The second sub joint 20 is sleeved into the second longitudinal screw rod 222 and the second transverse screw rod 212, the second longitudinal collar 223 is riveted on the second longitudinal screw rod 222, and the second transverse collar 213 is riveted on the second transverse screw rod 212.

Finally, the countersunk screws 231 are respectively inserted into the countersunk screw holes 131 of the first sub-joint 10 and the second sub-joint 20.

Other configurations of the vehicle 2 according to the embodiments of the disclosure are known to those of ordinary skill in the art and will not be described in detail herein.

In the description of the disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be configured and operated in a particular orientation. Therefore, such terms should not be construed as limiting of the disclosure.

In addition, the terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the description of the disclosure, "a plurality of" means two or more unless it is specifically defined otherwise.

In the disclosure, unless otherwise explicitly specified or defined, the terms such as "install", "connect", "connection", and "fix" should be understood in a broad sense. For example, the connection may be a fixed connection, a detachable connection, an integral connection; the connection may be a mechanical connection or an electrical connection; or the connection may be a direct connection, an indirect connection through an intermediate medium, internal communication between two components, or an interaction relationship between two components. A person of ordinary skill in the art may understand the specific meanings of the foregoing terms in the disclosure according to specific situations.

In the disclosure, unless otherwise explicitly specified or defined, the first feature being located "above" or "below" the second feature may be the first feature being in a direct contact with the second feature, or the first feature being in an indirect contact with the second feature through an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the disclosure. In this specification, schematic descriptions of the foregoing terms are not necessarily directed at the same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of the disclosure are shown and described above, it may be understood that the foregoing embodiments are exemplary, and cannot be understood as a limitation to the disclosure. A person of ordinary skill in the art may make changes, modifications, replacements, and variations to the foregoing embodiments without departing from the scope of the disclosure.

What is claimed is:

1. A body frame joint, comprising:
a first sub-joint having a first transverse beam connecting plate, a first longitudinal beam connecting plate, and a first side plate, the first side plate being an L-shaped plate, the first transverse beam connecting plate being connected with the first longitudinal beam connecting plate, and the first side plate being connected with a side of the first transverse beam connecting plate and a side of the first longitudinal beam connecting plate; and
a second sub-joint having a second transverse beam connecting plate, a second longitudinal beam connecting plate, and a second side plate, the second side plate being an L-shaped plate, the second transverse beam connecting plate being connected with the second longitudinal beam connecting plate, and the second side plate being connected with a side of the second transverse beam connecting plate and a side of the second longitudinal beam connecting plate;
wherein a junction of the first transverse beam connecting plate and the first longitudinal beam connecting plate is chamfered and a junction of the second transverse beam connecting plate and the second longitudinal beam connecting plate is chamfered;
wherein the first and second side plates each have a first thickness and the first and second transverse beam connecting plates and the first and second longitudinal beam connecting plates each have a second thickness, the second thickness being greater than the first thickness;
wherein the first sub-joint and the second sub-joint are configured to be engaged such that the first and second transverse beam connecting plates and the first and second side plates define a transverse beam connection groove and the first and second longitudinal beam connecting plates and the first and second side plates define a longitudinal beam connection groove; and
wherein the body frame joint is configured to be mounted to a body frame having a transverse beam and a longitudinal beam with the transverse beam disposed in the transverse beam connection groove and the longitudinal beam disposed in the longitudinal beam connection groove.

2. The body frame joint according to claim 1, wherein the first transverse beam connecting plate, the first longitudinal beam connecting plate, and the first side plate are integrally formed; and
wherein the second transverse beam connecting plate, the second longitudinal beam connecting plate, and the second side plate are integrally formed.

3. The body frame joint according to claim 1, wherein the first transverse beam connecting plate and the first longitudinal beam connecting plate are perpendicular to the first side plate, the first longitudinal beam connecting plate and the second longitudinal beam connecting plate are perpendicular to the second side plate, and the first side plate is parallel to the second side plate.

4. The body frame joint according to claim 1, wherein the first side plate and the second side plate each include countersunk screw holes;
wherein the first side plate is configured to be mounted to the transverse beam and the longitudinal beam by countersunk screws mated with the countersunk screw holes of the first side plate;
wherein the second side plate is configured to be mounted to the transverse beam and the longitudinal beam by countersunk screws mated with the countersunk screw holes of the second side plate; and
wherein the countersunk screw holes are configured with slots, an outer surface of each of the countersunk screws of the first side plate is flush with the outer surface of the first side plate, and an outer surface of each of the countersunk screws of the second side plate is flush with the outer surface of the second side plate.

5. A body frame joint, comprising:
a first sub-joint having a first transverse beam connecting plate, a first longitudinal beam connecting plate, and a first side plate, the first transverse beam connecting plate being connected with the first longitudinal beam connecting plate and the first side plate being connected with a side of the first transverse beam connecting plate and a side of the first longitudinal beam connecting plate; and
a second sub-joint having a second transverse beam connecting plate, a second longitudinal beam connecting plate, and a second side plate, the second transverse beam connecting plate being connected with the second longitudinal beam connecting plate and the second side plate being connected with a side of the second transverse beam connecting plate and a side of the second longitudinal beam connecting plate;
wherein the first sub-joint and the second sub-joint are configured to be engaged such that the first and second transverse beam connecting plates and the first and second side plates define a transverse beam connection groove and the first and second longitudinal beam connecting plates and the first and second side plates define a longitudinal beam connection groove;
wherein the body frame joint is configured to be mounted to a body frame having a transverse beam and a longitudinal beam with the transverse beam disposed in the transverse beam connection groove and the longitudinal beam disposed in the longitudinal beam connection groove;
wherein the first transverse beam connecting plate includes a first transverse screw rod hole, a first transverse screw rod is mated with the first transverse screw rod hole, a first transverse collar is riveted on the first transverse screw rod, and the first transverse screw rod is configured to slidably mate with a first transverse sliding groove of the transverse beam when the body frame joint is mounted to the body frame;

wherein the second transverse beam connecting plate includes a second transverse screw rod hole, a second transverse screw rod is mated with the second transverse screw rod hole, a second transverse collar is riveted on the second transverse screw rod, and the second transverse screw rod is configured to slidably mate with a second transverse sliding groove of the transverse beam when the body frame joint is mounted to the body frame;

wherein the first longitudinal beam connecting plate includes a first longitudinal screw rod hole; a first longitudinal screw rod is mated with the first longitudinal screw rod hole; a first longitudinal collar is riveted on the first longitudinal screw rod, and the first longitudinal screw rod is configured to slidably mate with a first longitudinal sliding groove of the longitudinal beam when the body frame joint is mounted to the body frame; and wherein the second longitudinal beam connecting plate includes a second longitudinal screw rod hole, a second longitudinal screw rod mated with the second longitudinal screw rod hole, a second longitudinal collar riveted on the second longitudinal screw rod, and wherein the second longitudinal screw rod is configured to slidably mate with a second longitudinal sliding groove of the longitudinal beam when the body frame joint is mounted to the body frame.

6. The body frame joint according to claim 5, further comprising:
a first transverse gasket sleeved on the first transverse screw rod and configured to slidably mate with the first transverse sliding groove;
a second transverse gasket sleeved on the second transverse screw rod and configured to slidably mate with the second transverse sliding groove;
a first longitudinal gasket sleeved on the first longitudinal screw rod and configured to slidably mate with the first longitudinal sliding groove; and
a second longitudinal gasket sleeved on the second longitudinal screw rod and configured to slidably mate with the second longitudinal sliding groove.

7. The body frame joint according to claim 5, wherein an inner side surface of the first transverse beam connecting plate and an inner side surface of the first longitudinal beam connecting plate each include a first inner rib, the first inner rib of the first transverse beam connecting plate being connected with the first inner rib of the first longitudinal beam connecting plate by a first corner rib at a junction of the first transverse beam connecting plate and the first longitudinal beam connecting plate;
wherein an inner side surface of the second transverse beam connecting plate and an inner side surface of the second longitudinal beam connecting plate each include a second inner rib, the second inner rib of the second transverse beam connecting plate being connected with the second inner rib of the second longitudinal beam connecting plate by a second corner rib provided at a junction of the second transverse beam connecting plate and the second longitudinal beam connecting plate; and
wherein a thickness of the first corner rib is greater than a thickness of each of the first inner ribs and a thickness of the second corner rib is greater than a thickness of each of the second inner ribs.

8. The body frame joint according to claim 7, wherein the first inner rib of the first transverse beam connecting plate is disposed along a center of the first transverse beam connecting plate in a width direction of the first transverse beam connecting plate, the second inner rib of the second transverse beam connecting plate is disposed along a center of the second transverse beam connecting plate in a width direction of the second transverse beam connecting plate, the first inner rib of the first longitudinal beam connecting plate is disposed along a center of the first longitudinal beam connecting plate in a width direction of the first longitudinal beam connecting plate, and the second inner rib of the second longitudinal beam connecting plate is disposed along a center of the second longitudinal beam connecting plate in a width direction of the second longitudinal beam connecting plate.

9. The body frame joint according to claim 7, wherein the first transverse screw rod hole extends through the first inner rib of the first transverse beam connecting plate, the first inner rib of the first transverse beam connecting plate is configured to mate with the first transverse sliding groove, the first longitudinal screw rod hole extends through the first inner rib of the first longitudinal beam connecting plate, the first inner rib of the first longitudinal beam connecting plate is configured to mate with the first longitudinal sliding groove, and the first corner rib is configured to mate with a junction of the first transverse sliding groove and the first longitudinal sliding groove; and
wherein the second transverse screw rod hole extends through the second inner rib of the second transverse beam connecting plate, the second inner rib of the second transverse beam connecting plate is configured to mate with the second transverse sliding groove, the second longitudinal screw rod hole extends through the second inner rib of the second longitudinal beam connecting plate, the second inner rib of the second longitudinal beam connecting plate is configured to mate with the second longitudinal sliding groove, and the second corner rib is configured to mate with a junction of the second transverse sliding groove and the second longitudinal sliding groove.

10. The body frame joint according to claim 1, further comprising:
at least one first outer rib disposed on an outer side surface of the first transverse beam connecting plate and at least one first outer rib disposed on an outer side surface of the first longitudinal beam connecting plate at the junction of the first transverse beam connecting plate and the first longitudinal beam connecting plate, the first outer ribs being rounded; and
at least one second outer rib disposed on an outer side surface of the second transverse beam connecting plate and at least one second outer rib disposed on an outer side surface of the second longitudinal beam connecting plate at the junction of the second transverse beam connecting plate and the second longitudinal beam connecting plate, the second outer ribs being rounded.

11. The body frame joint according to claim 10, wherein the at least one first outer rib disposed on the first transverse beam connecting plate comprises two first outer ribs spaced apart along a width direction of the first transverse beam connecting plate, and the at least one first outer rib disposed on the first longitudinal beam connecting plate comprises two first outer ribs spaced apart along a width direction of the first longitudinal beam connecting plate and the at least one second outer rib disposed on the second transverse beam connecting plate comprises two second outer ribs spaced apart along a width direction of the second transverse beam connecting plate, and the at least one second outer rib disposed on the second longitudinal beam connecting plate comprises two second outer ribs spaced apart along a width direction of the second longitudinal beam connecting plate.

12. The body frame joint according to claim 4, wherein
   the first transverse beam connecting plate includes a first transverse screw rod hole, a first transverse screw rod mated with the first transverse screw rod hole, a first transverse collar riveted on the first transverse screw rod, and wherein the first transverse screw rod is configured to slidably mate with a first transverse sliding groove of the transverse beam when the body frame joint is mounted to the body frame;
   wherein the second transverse beam connecting plate includes a second transverse screw rod hole, a second transverse screw rod mated with the second transverse screw rod hole, a second transverse collar riveted on the second transverse screw rod, and wherein the second transverse screw rod is configured to slidably mate with a second transverse sliding groove of the transverse beam when the body frame joint is mounted to the body frame;
   wherein the first longitudinal beam connecting plate includes a first longitudinal screw rod hole, a first longitudinal screw rod mated with the first longitudinal screw rod hole, a first longitudinal collar riveted on the first longitudinal screw rod, and wherein the first longitudinal screw rod is configured to slidably mate with a first longitudinal sliding groove of the longitudinal beam when the body frame joint is mounted to the body frame; and
   wherein the second longitudinal beam connecting plate includes a second longitudinal screw rod hole, a second longitudinal screw rod mated with the second longitudinal screw rod hole, a second longitudinal collar riveted on the second longitudinal screw rod, and wherein the second longitudinal screw rod is configured to slidably mate with a second longitudinal sliding groove of the longitudinal beam when the body frame joint is mounted to the body frame.

13. The body frame joint according to claim 12, further comprising:
   a first transverse gasket sleeved on the first transverse screw rod and configured to slidably mate with the first transverse sliding groove;
   a second transverse gasket sleeved on the second transverse screw rod and configured to slidably mate with the second transverse sliding groove;
   a first longitudinal gasket sleeved on the first longitudinal screw rod and configured to slidably mate with the first longitudinal sliding groove; and
   a second longitudinal gasket sleeved on the second longitudinal screw rod and configured to slidably mate with the second longitudinal sliding groove.

14. The body frame joint according to claim 13, wherein an inner side surface of the first transverse beam connecting plate and an inner side surface of the first longitudinal beam connecting plate each include a first inner rib, the first inner rib of the first transverse beam connecting plate being connected with the first inner rib of the first longitudinal beam connecting plate by a first corner rib at the junction of the first transverse beam connecting plate and the first longitudinal beam connecting plate;
   wherein an inner side surface of the second transverse beam connecting plate and an inner side surface of the second longitudinal beam connecting plate each include a second inner rib, the second inner rib of the second transverse beam connecting plate being connected with the second inner rib of the second longitudinal beam connecting plate by a second corner rib at a junction of the second transverse beam connecting plate and the second longitudinal beam connecting plate; and
   wherein a thickness of the first corner rib is greater than a thickness of each of the first inner ribs and a thickness of the second corner rib is greater than a thickness of each of the second inner ribs.

15. The body frame joint according to claim 14, wherein the first inner rib of the first transverse beam connecting plate is disposed along a center of the first transverse beam connecting plate in a width direction of the first transverse beam connecting plate, the second inner rib of the second transverse beam connecting plate is disposed along a center of the second transverse beam connecting plate in a width direction of the second transverse beam connecting plate, the first inner rib of the first longitudinal beam connecting plate is disposed along a center of the first longitudinal beam connecting plate in a width direction of the first longitudinal beam connecting plate, and the second inner rib of the second longitudinal beam connecting plate is disposed along a center of the second longitudinal beam connecting plate in a width direction of the second longitudinal beam connecting plate.

16. The body frame joint according to claim 14, wherein the first transverse screw rod hole extends through the first inner rib of the first transverse beam connecting plate, the first inner rib of the first transverse beam connecting plate is configured to mate with the first transverse sliding groove, the first longitudinal screw rod hole extends through the first inner rib of the first longitudinal beam connecting plate, the first inner rib of the first longitudinal beam connecting plate is configured to mate with the first longitudinal sliding groove, and the first corner rib is configured to mate with a junction of the first transverse sliding groove and the first longitudinal sliding groove; and
   wherein the second transverse screw rod hole extends through the second inner rib of the second transverse beam connecting plate, the second inner rib of the second transverse beam connecting plate is configured to mate with the second transverse sliding groove, the second longitudinal screw rod hole extends through the second inner rib of the second longitudinal beam connecting plate, the second inner rib of the second longitudinal beam connecting plate is configured to mate with the second longitudinal sliding groove, and the second corner rib is configured to mate with a junction of the second transverse sliding groove and the second longitudinal sliding groove.

17. The body frame joint according to claim 15, further comprising:
   at least one first outer rib disposed on an outer side surface of the first transverse beam connecting plate and at least one first outer rib disposed on an outer side surface of the first longitudinal beam connecting plate at the junction of the first transverse beam connecting plate and the first longitudinal beam connecting plate, the first outer ribs being rounded; and
   at least one second outer rib disposed on an outer side surface of the second transverse beam connecting plate and at least one second outer rib disposed on an outer side surface of the second longitudinal beam connecting plate at the junction of the second transverse beam connecting plate and the second longitudinal beam connecting plate, the second outer ribs being rounded.

18. A vehicle, comprising:

a body frame including a transverse beam and a longitudinal beam connected with the transverse beam; and the body frame joint according to claim 1.

\* \* \* \* \*